H. S. KROSSIN.
COFFEE POT.
APPLICATION FILED MAR. 15, 1919.

1,325,479.

Patented Dec. 16, 1919.

INVENTOR:
H. S. Krossin
BY his ATTORNEY:
A. M. Carlsen.

UNITED STATES PATENT OFFICE.

HARALD S. KROSSIN, OF ST. PAUL, MINNESOTA.

COFFEE-POT.

1,325,479. Specification of Letters Patent. Patented Dec. 16, 1919.

Application filed March 15, 1919. Serial No. 282,771.

*To all whom it may concern:*

Be it known that I, HARALD S. KROSSIN, a citizen of the United States, residing at St. Paul, in the county of Ramsey and State of Minnesota, have invented a new and useful Coffee-Pot, of which the following is a specification.

Figure 1:
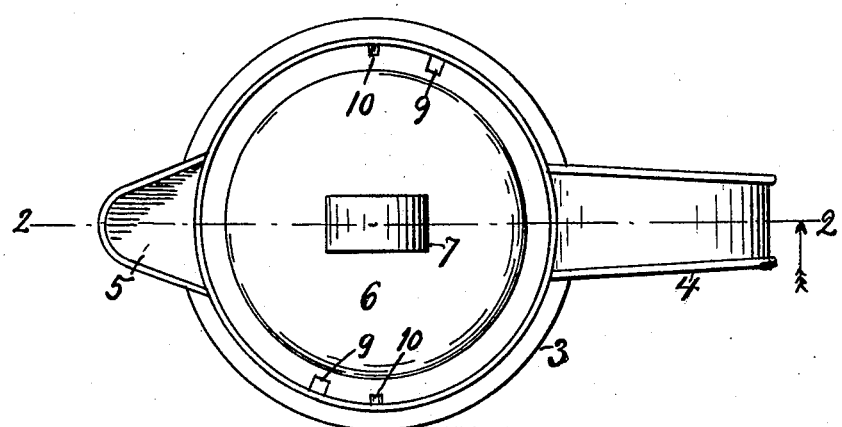
Figure 2:
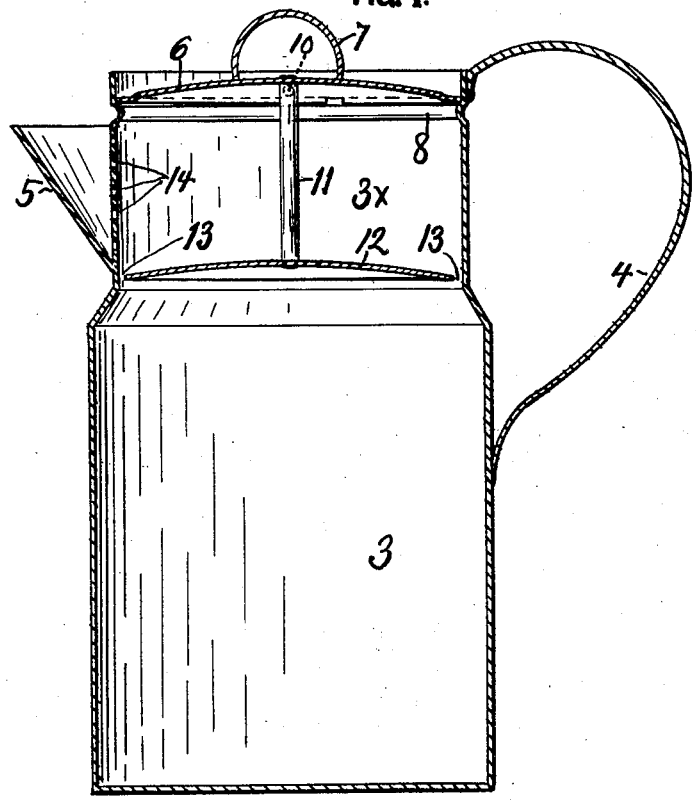

My invention relates to improvement in coffee-pots and other cooking kettles, and the object is to provide means by which such cooking vessels may be prevented from boiling over. It is a well known fact that wherever the contents of a cooking vessel is such that a part of it floats to the top of the water and forms a coating, crust or layer, that prevents the free escape of the steam from the boiling water, the steam will mix with the water and cause it to expand into a foamy mass which rises and flows over the vessel. This being especially the case with a coffee-pot when the dry coffee is put into the water and forms a cover upon the surface of it of sufficient tenacity to prevent the free escape of the steam when the water starts to boil; and the result is that the coffee and the water often boil over and quench the fire, and in the case of gas burners the latter are clogged up by the coffee and the coffee is lost and the stove put in bad shape. To overcome such boiling over I provide the cooking vessel with the means illustrated in the accompanying drawing, in which:

Figure 1 is a top view of a coffee-pot embodying my invention. Fig. 2 is a diametrical section on the line 2—2 in Fig. 1.

Referring to the drawing by reference numerals, 3 designates the body, 4 the handhold, 5 the spout and 6 the cover of the coffee-pot; said cover having a finger hold 7 by which to lift and turn it. The cover rests upon an internal ridge 8 a short distance down from the top of the can body, so as to leave a guarding rim above the cover.

The cover is provided with two diametrically opposite notches, 9, to permit the cover to pass downward lower than the two pins or studs 10 with which the can body is provided and which prevent raising of the cover after it is down below the studs and given a slight rotary movement.

Spaced below and secured to said cover by suitable means, preferably by a central rod 11, is a disk 12, between the edges of which and the can body there is a narrow space 13. The disk is preferably concave at its under-side and positioned slightly below the usual perforations 14, through which the steam, and later on the boiled coffee reach the spout 5 after getting into the space $3^\times$ between the disk and the cover.

In the operation or use of the can, when the boiling starts the layer of coffee upon the water is raised up under the disk 12, where adhesion and the concave form of the disk hold it while the steam from the boiling water escapes upward through the space 13 and the perforations 14, and as the signal of boiling a small amount of steam may also escape from the apertures 9.

If any coffee ground at all is forced up through the space 13 it will be so little that it can never form any layer on the top of any foam which might escape the same way up into the compartment $3^\times$, and as the foam is thus at liberty to give off its steam it turns into a few drops of water, which settle back down through the aperture 13 into the can again.

After the boiling-over is thus averted and the ground coffee is thoroughly softened by the boiling water, it will settle down from under the disk 12 to the bottom of the can; such settling or sinking may also be hastened by a shaking movement of the coffee-pot just after the boiling is completed.

What I claim is:

1. A tea or coffee pot having the upper portion of its body cylindrical and of substantially equal diameter, a cover closing the upper end of said cylindrical portion, a central rod depending from the cover, a solid disk fixed to the lower end of said rod and almost filling the lower end of the cylindrical portion of the body, said disk being convexo-concave with the concave at its under side, and said cover having one or more comparatively small steam outlets, and means for holding the cover in its place on the body.

2. The structure specified in claim 1, said body having a spout at one side of the cylindrical portion, between the cover and the disk.

3. The structure specified in claim 2, said cylindrical portion extending upwardly past the edge of the cover, and having an internal collar for the cover to rest upon.

In testimony whereof I affix my signature.

H. S. KROSSIN.